United States Patent
Romer et al.

(10) Patent No.: US 7,322,812 B2
(45) Date of Patent: Jan. 29, 2008

(54) TRANSFER LOCK FOR A TABLETTING PLANT

(75) Inventors: Harald Romer, Reinbek (DE); Frank Schade, Anker (DE); Detlef Nuppenau, Salem (DE); Ulrich Arndt, Lauenburg (DE)

(73) Assignee: Fette GmbH, Schwarzenbek (DE)

( * ) Notice: Subject to any disclaimer, the term of this patent is extended or adjusted under 35 U.S.C. 154(b) by 108 days.

(21) Appl. No.: 11/406,141

(22) Filed: Apr. 18, 2006

(65) Prior Publication Data

US 2006/0269637 A1 Nov. 30, 2006

(30) Foreign Application Priority Data

Apr. 20, 2005 (DE) .................. 10 2005 018 905

(51) Int. Cl.
*B29C 43/08* (2006.01)
*B29C 33/70* (2006.01)

(52) U.S. Cl. ................ 425/78; 425/151; 425/225; 425/229; 425/345; 425/DIG. 45; 425/DIG. 47

(58) Field of Classification Search .............. 425/78, 425/151, 225, 227, 229, 345, DIG. 45, DIG. 47
See application file for complete search history.

(56) References Cited

U.S. PATENT DOCUMENTS 4,654,171 A * 3/1987 Boncoeur et al. ........ 425/405.1

6,676,863 B2 * 1/2004 Christiaens et al. ........ 425/225
7,140,856 B2 * 11/2006 Zeddies et al. ............... 425/78

FOREIGN PATENT DOCUMENTS

| DE | 102 18 220 C1 | 6/2003 |
| EP | 0 830 896 B1 | 9/1997 |
| GB | 2 237 816 A | 5/1991 |

* cited by examiner

*Primary Examiner*—Yogendra N. Gupta
*Assistant Examiner*—Thu Khanh T. Nguyen
(74) *Attorney, Agent, or Firm*—Vidas, Arrett & Steinkraus, P.A.

(57) ABSTRACT

A transfer lock for a tabletting plant, which has a casing with side walls where at least one wall has an aperture which is adapted to be closed by a first flap which is pivotable inwardly into the interior of the casing and is adapted to be locked by a locking device operable from the interior of the casing, wherein the aperture is externally surrounded by a connection profile which is adapted to be sealingly brought together with a counter-profile of a lock channel and the flap externally has a driver profile which interacts with a counter-driver profile of a second flap mounted at the end of the lock channel when the counter-profile of the lock channel is connected to the connection profile, thus allowing to pivot the two flaps into the interior of the casing when the locking device is unlocked, which integrates the connection profile into the material of the casing wall.

5 Claims, 5 Drawing Sheets

TRANSFER LOCK FOR A TABLETTING PLANT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Tabletting machines commonly include a so-called rotary press which is accommodated inside a casing. The casing normally is tightly sealed from the outside via side walls and/or window-type flaps to prevent product dust, which inevitably will develop during operation, from leaking to the outside. If more dust develops it will be exhausted permanently. The feed of the powdered material and the discharge of the tablets are performed into and out of the casing, respectively, via ducts.

Tablets which contain concentrated or toxic substances require that the tablets be removed from the interior of the tabletting machine casing for further treatment and packaging with operators not getting into contact with them or being exposed to detrimental environmental effects. If strict sterility requirements are made it should be possible to exchange components of the rotary press in a way to prevent the operator from getting into contact with those components or the environment from getting contaminated. Hence, it is known to provide so-called transfer locks (e.g. RTP). They have a flap which is pivotally supported to be swung inwardly in the area of an aperture in a casing wall and normally closes the aperture tightly. To this end, the inside of the casing wall has mounted thereon a locking device which has to be unlocked first for the flap to be opened. Unlocking is done from inside. An access for a glove to enable unlocking is provided in the casing wall near the aperture.

A lock channel, e.g. a piece of pipe or a flexible tube of a major diameter, has a counter-profile at one end that interacts with a connection profile around the aperture in the casing wall. Further, this end has attached thereto a second flap which interacts with a driver profile of the first flap when the connection profile and counter-profile are brought into engagement. Now, if the first flap is unlocked from inside it becomes possible to swing the second flap into the interior of the press casing by means of the first one. This creates a sealed passage into the casing interior from the lock channel. The access for a glove helps in removing an article from or inserting the article into the outwardly closed lock channel.

The connection profile and counter-profile mostly define a bayonet joint. For a creation of the connection profile in the casing wall, it is known to form metallic flanges from high-grade steel and screw them together on the two sides of the aperture. Manufacturing and mounting such components is troublesome and requires great care with regard to tightness and sterility.

It is the object of the invention to provide a transfer lock for a tabletting plant in which the assembly effort is reduced and improved tightness is achieved.

BRIEF SUMMARY OF THE INVENTION

According to the invention, the connection profile is integrated into the material of the casing wall. According to an aspect of the invention, the connection profile is formed integrally with the casing wall or a portion thereof. The casing wall is formed from a transparent plastic material for reasons of better inspectability. The connection profile may be shaped into the casing wall itself. Alternatively, it is also possible to form one portion of the casing wall integrally with the connection profile and appropriately integrate this portion into the casing wall, e.g. by pasting it thereto.

When the casing wall is made of steel the connection profile can be integrated into the casing wall as a component welded thereto.

The advantage of the invention is that it markedly reduces the assembly effort and helps achieve a large tightness. It further avoids gaps and jointing surfaces the cleaning of which is problematic. It altogether improves the possibility of cleaning them. Finally, it helps obtain a reduction in weight.

BRIEF DESCRIPTION OF THE SEVERAL VIEWS OF THE DRAWINGS

The invention will be described in more detail below with reference to the drawings.

DETAILED DESCRIPTION OF THE INVENTION

Figure 7:
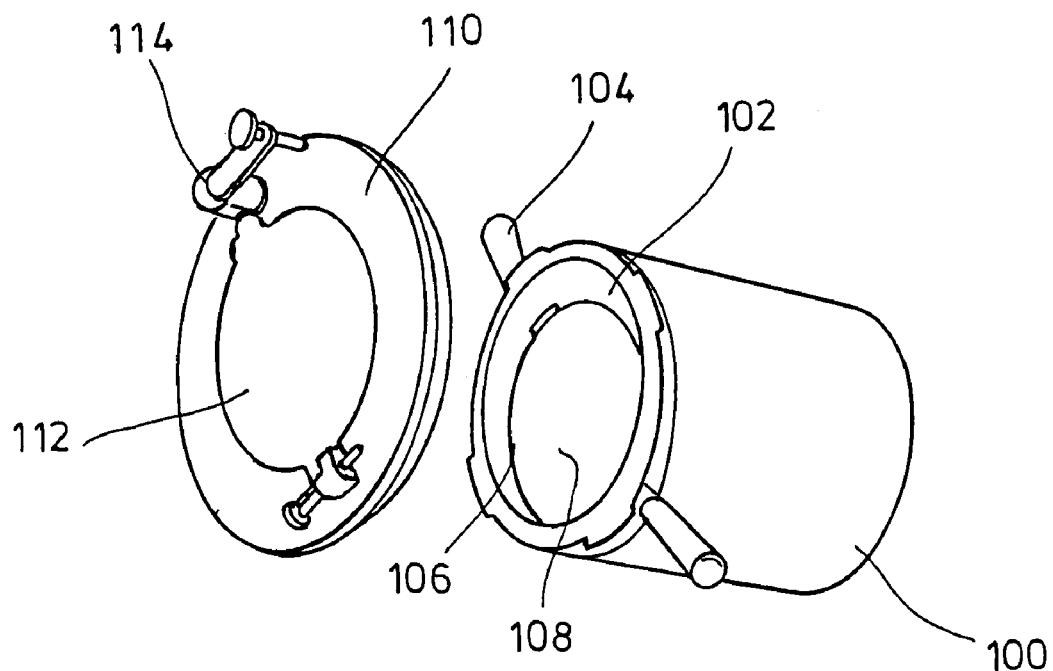
FIG. 7 shows a perspective view of a lock system according to the state of the art prior to the putting into service.

While this invention may be embodied in many different forms, there are described in detail herein a specific preferred embodiment of the invention. This description is an exemplification of the principles of the invention and is not intended to limit the invention to the particular embodiment illustrated FIGS. 7 and 8, which depict the state of the art, illustrate a lock vessel 100 which has a counter-profile 102 at the left-hand end in FIG. 7, in the form of a bayonet-type component. Handles at opposed sides (illustrated at 104) serve for handling the lock vessel. A lid 106 which sealingly closes the vessel 100 is located inside the annular profile 102. In an external area, it has a counter-driver profile 108 which is also shaped in the fashion of a bayonet connection.

A flanged component 110, e.g. in high-grade steel, pivotally supports a flap 112 which is retained in the closing position by a locking device 114.

Figure 8:
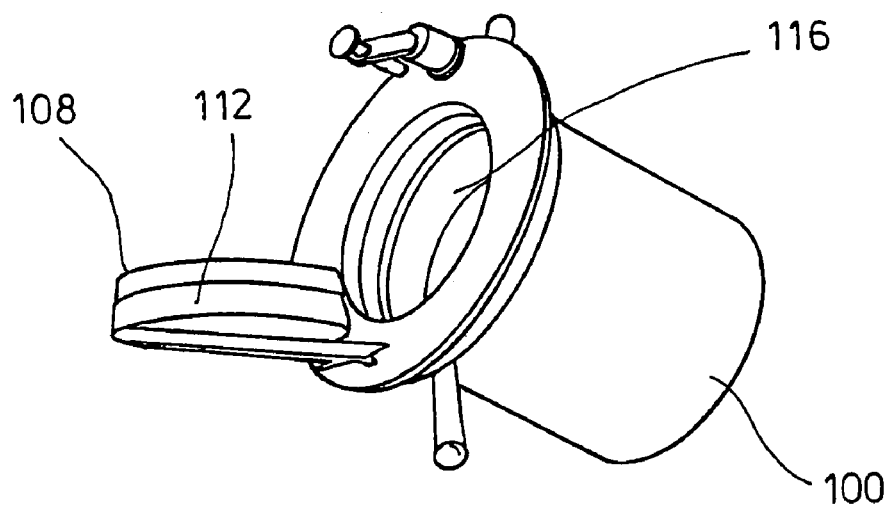
FIG. 8 shows a perspective view of the system in FIG. 7 during the putting into operation.

Attaching the lock vessel 100 on the reception profile of the flange 100, which is not shown, and rotating it, e.g. through 60°, sealingly mounts the lock vessel 100 on the profile 110. At the same time, the vessel is locked on the flap 112 via the counter-driver profile of the lid 106. This makes it possible to unlock the locking device 114 and allows to swing out the flap 112 as can be seen in FIG. 8. The lid 108 is carried along while the flap 112 is being swung out. Now, a communication is established between the interior 116 of the lock vessel 100 and the interior of the casing, which is not shown and to which the flange 110 pertains.

Figure 1:
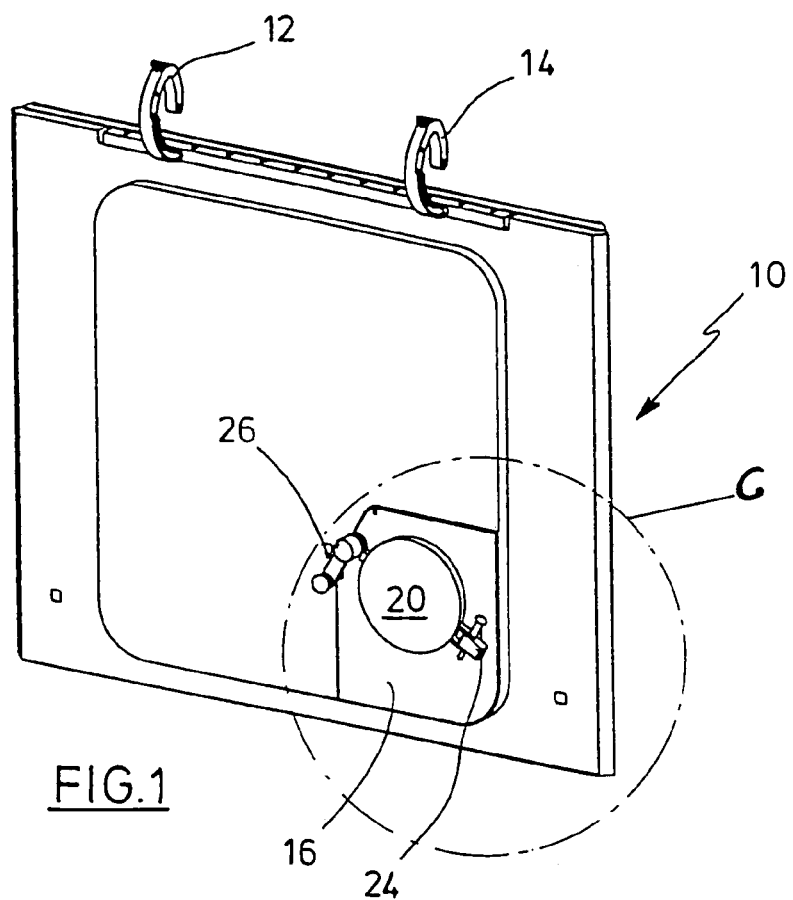
FIG. 1 shows a perspective rear view of a casing wall of a tabletting machine.
Figure 9:
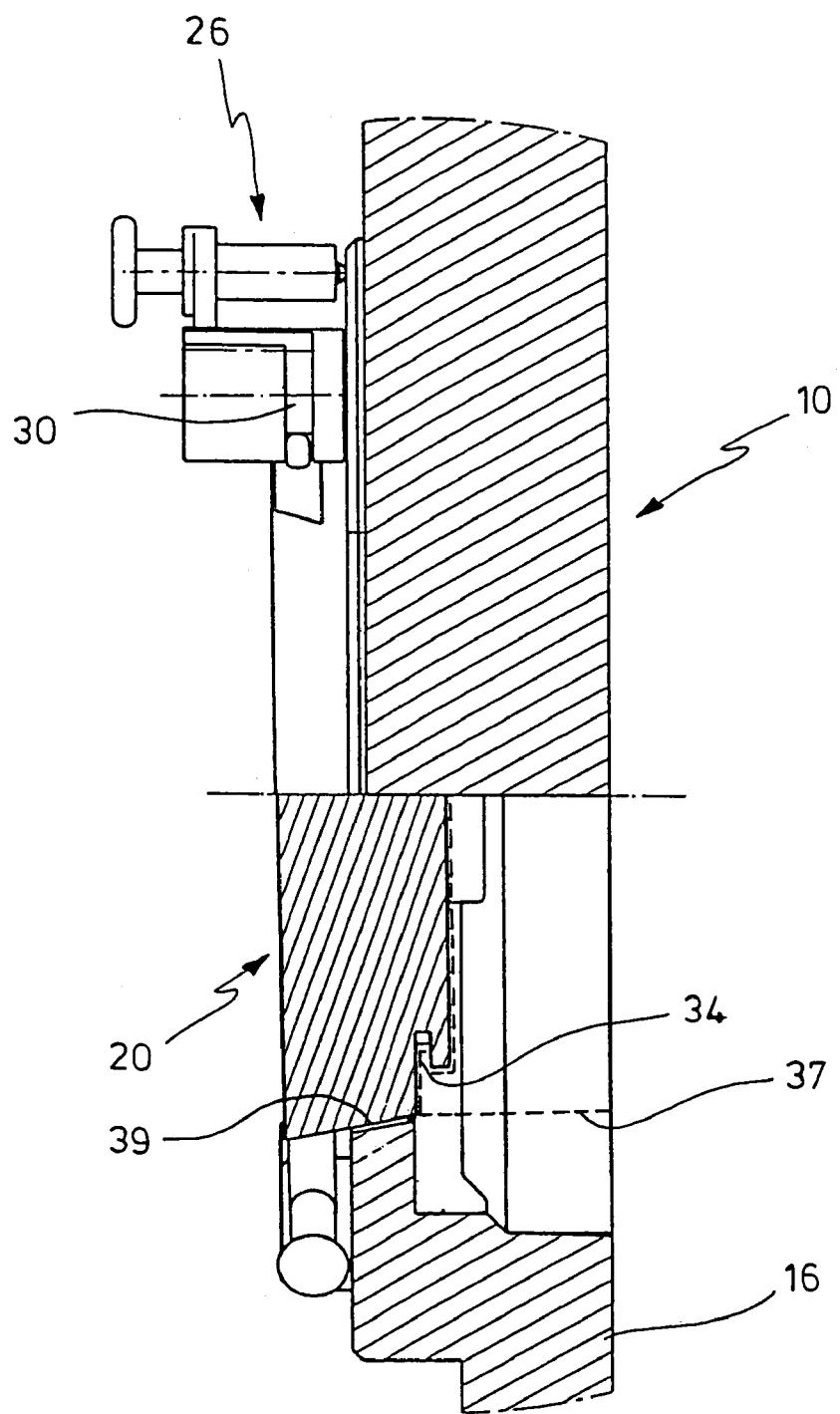
FIG. 9 shows a magnification of the detail 5 of FIG. 4.

FIGS. 1 and 9 illustrate a side wall 10 of a casing of a tabletting machine which is not shown in detail and has the shape of a rotary press. The side wall 10 is formed from a transparent material and is shaped as a flap which is pivotally supported about hook-shaped bearing components 12, 14 at the upper edge on the casing. In the closed position, it is possible to tightly lock the side wall 10 which, however, is not shown.

Figure 2:
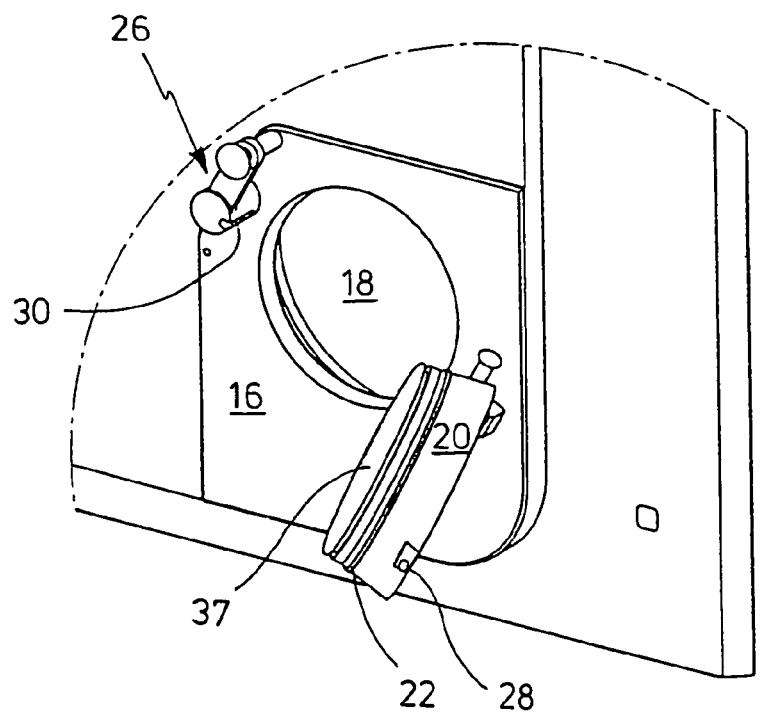
FIG. 2 shows some portion of the representation of FIG. 1 with the first flap opened.
Figure 6:
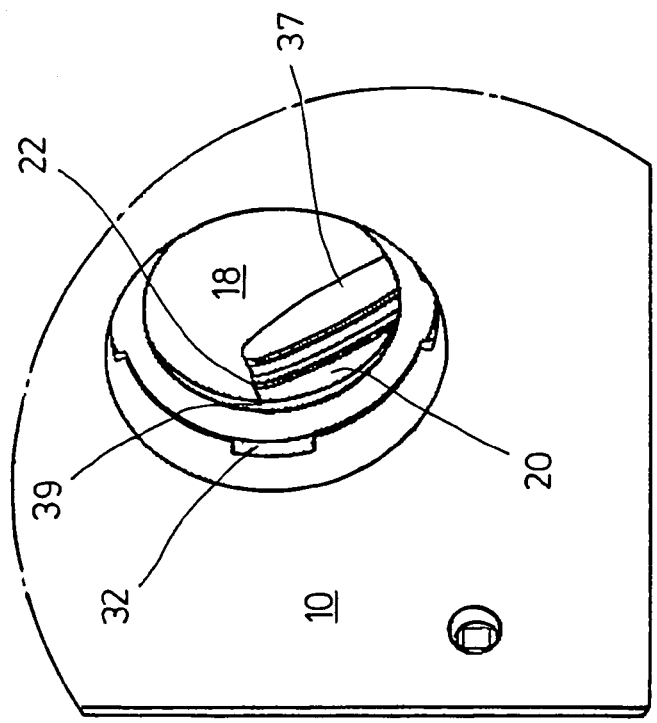
FIG. 6 shows a magnification of the front side portion encircled in FIG. 5.
Figure 5:
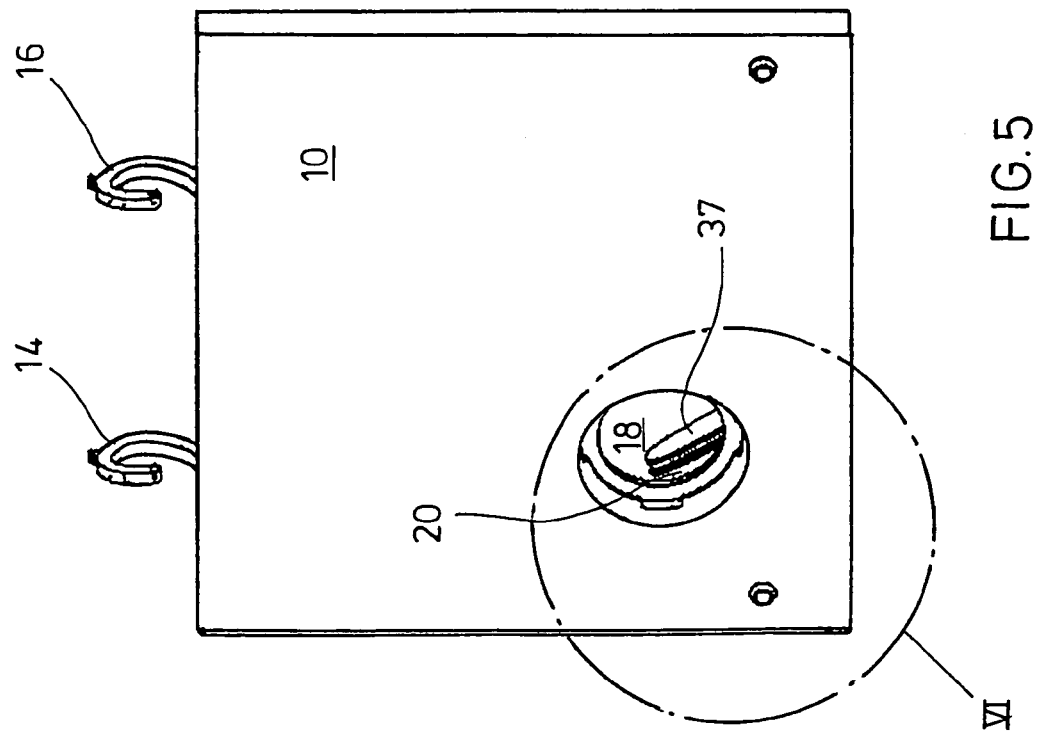
FIG. 5 shows a front view of a casing wall of a tabletting machine.

A circular aperture 18 which can be locked by a flap 20 is defined in a slightly thickened portion 16 of the side wall 10. A seal 22 ensures a sufficient sealing effect in the closing position via an interaction with a sealing surface 39 of the aperture. The flap 20 can be pivoted about a hinge 24 which is mounted at the portion 16 at the inside thereof. FIG. 1 shows the closed position whereas FIG. 2 and FIGS. 5 and 6 show the opened position. A locking device 26 which also is attached to the inside serves for locking the flap 20 in the closed position. The flap 20 circumferentially has a locking pin 28 which interacts with an L-shaped locking groove 30 of an interlocking element (FIG. 9).

The locking device 26 can be actuated only from the inside of the casing which is not shown. For an access to the interior of the casing, an aperture for a glove (not shown in the Figures) is provided in the wall portion 10 or the adjoining wall portion. The aperture allows the operator to move his hands therethrough into the interior of the casing and also actuate the locking device 26, for example.

Figure 3:
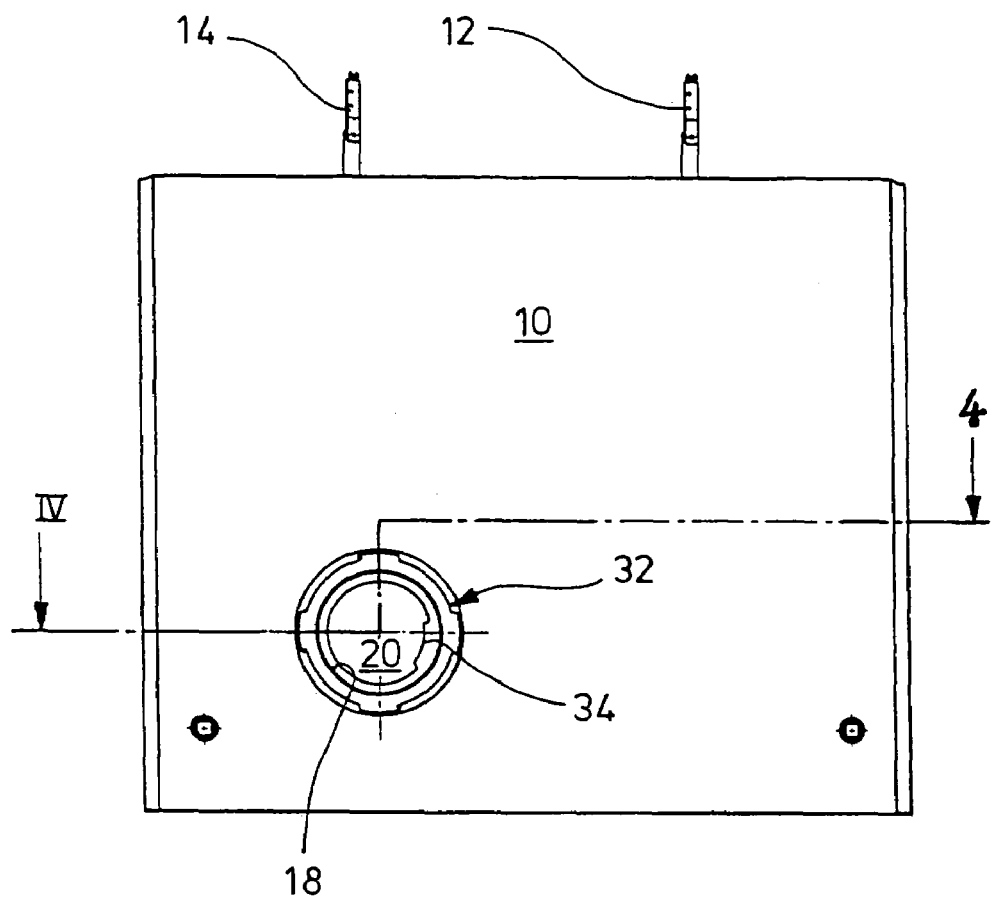
FIG. 3 shows a front view of the casing wall of FIG. 1.
Figure 4:
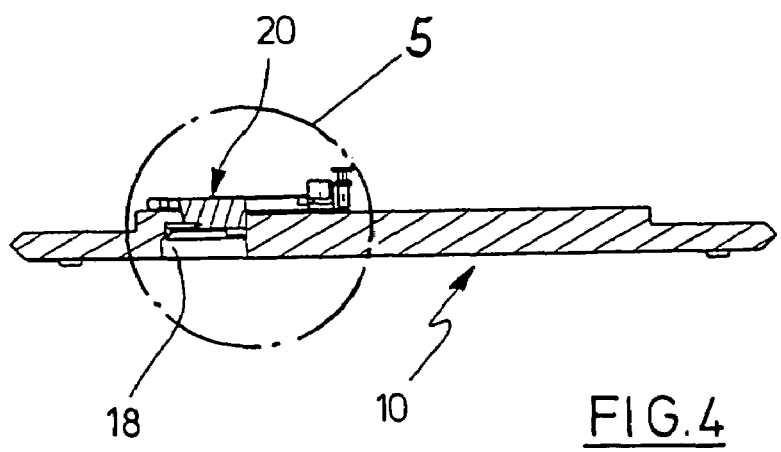
FIG. 4 shows a section through the representation of FIG. 3 along line 4-4.

FIG. 3 allows to see that a connection profile 32 is formed for a bayonet joint around the aperture 18 at the outside of the side wall 10. The flap 20, which is shown in the closed position in FIG. 3, has a driver profile 34 on the outwardly facing side that also is in the shape of a bayonet connection.

At one end, a lock channel which is not shown has a profile which is configured as a counter-profile to the connection profile 32. Thus, placing the lock channel axially and rotating it subsequently allows it to be joined to the wall 10 firmly and sealingly. The lock channel which is not shown further has a second flap which is mounted at the end and has a counter-profile to the profile 34 of the first flap 20. When the lock channel is attached to the side wall 10 as described the second flap will simultaneously communicate sealingly with the first flap 20 via the bayonet joint. Thus, the two flaps form a unit and, when the locking device 26 is unlocked, can be swung into the casing of the tablet press as is shown in FIGS. 5 and 6. As a result, there is a passage into the interior of the casing from the lock channel, and vice versa.

At 37 in FIGS. 5 and 6, the lid of the lock channel is outlined which communicates with the flap 20 via the bayonet joint described.

As can be recognized the connection profile 32 is formed integrally with the wall 10. However, it is also conceivable to form the portion 16 integrally with the profile 32 and mount it on the wall 10 subsequently, e.g. by pasting or welding it thereto.

In FIG. 9, the dotted line 37 outlines the contour of the second flap which communicates with the first flap 20. The counter-profile of the lock channel is not illustrated.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A transfer lock for a tight-locked casing of a tabletting plant, particularly a tabletting press, wherein the casing has side walls where at least one wall has an aperture which is adapted to be closed by a first flap which is pivotable inwardly into the interior of the casing and is adapted to be locked by an operable locking device, wherein the aperture is externally surrounded by a connection profile which is adapted to be sealingly brought together with a counter-profile of a lock channel and the flap externally has a driver profile which interacts with a counter-driver profile of a second flap mounted at the end of the lock channel when the counter-profile of the lock channel is connected to the connection profile, thus allowing to pivot the two flaps into the interior of the casing when the locking device is unlocked, characterized in that the connection profile (32) is integrated into the material of the casing wall (10, 16).

2. The transfer lock according to claim 1, characterized in that the connection profile (32) and the counter-profile define a bayonet joint.

3. The transfer lock according to claim 1, characterized in that the driver profile (34) and the counter-driver profile define a bayonet catch.

4. The transfer lock according to claim 1, characterized in that the connection profile (32) is formed integrally with the casing wall (10) or a portion thereof.

5. The transfer lock according to claim 1, characterized in that a material portion has the aperture, a connection profile and a sealing surface pasted or welded to the casing wall.

* * * * *